US007453536B2

(12) United States Patent
Choi

(10) Patent No.: US 7,453,536 B2
(45) Date of Patent: Nov. 18, 2008

(54) LIQUID CRYSTAL DISPLAY AND MANUFACTURING METHOD THEREOF

(75) Inventor: Nak-Cho Choi, Seoul (KR)

(73) Assignee: Samsung Electronics Co., Ltd. (KR)

( * ) Notice: Subject to any disclaimer, the term of this patent is extended or adjusted under 35 U.S.C. 154(b) by 162 days.

(21) Appl. No.: 11/134,268

(22) Filed: May 23, 2005

(65) Prior Publication Data

US 2005/0264722 A1 Dec. 1, 2005

(30) Foreign Application Priority Data

May 24, 2004 (KR) .................. 10-2004-0036784

(51) Int. Cl.
G02F 1/1333 (2006.01)
G02F 1/1335 (2006.01)
G02F 1/1337 (2006.01)

(52) U.S. Cl. .................. 349/110; 349/106; 349/129
(58) Field of Classification Search ................ 349/106, 349/110, 145, 178, 129
See application file for complete search history.

(56) References Cited

U.S. PATENT DOCUMENTS

| 6,583,836 | B2 * | 6/2003 | Kim et al. ................. 349/129 |
| 6,593,982 | B2 * | 7/2003 | Yoon et al. ................ 349/106 |
| 6,621,550 | B1 * | 9/2003 | Arakawa et al. ........... 349/178 |
| 6,866,917 | B2 * | 3/2005 | Song .......................... 428/172 |
| 2001/0007487 | A1 * | 7/2001 | Yoon et al. ................ 349/106 |
| 2004/0125276 | A1 * | 7/2004 | Hong et al. ................ 349/106 |
| 2005/0140916 | A1 * | 6/2005 | Kume et al. ............... 349/156 |
| 2005/0162598 | A1 * | 7/2005 | Choi et al. ................. 349/139 |
| 2006/0132678 | A1 * | 6/2006 | Kikuchi et al. ............ 349/106 |

FOREIGN PATENT DOCUMENTS

JP 2002196336 A * 7/2002
JP 2003207771 A * 7/2003

* cited by examiner

*Primary Examiner*—Michael H Caley
(74) *Attorney, Agent, or Firm*—Cantor Colburn LLP

(57) ABSTRACT

A liquid crystal display is provided, which includes: a substrate; a color filter formed on the substrate, and having a depression and an opening; a common electrode formed on the color filter, and having a depression; and a black member formed on the common electrode and located at the depressions of the common electrode.

17 Claims, 11 Drawing Sheets

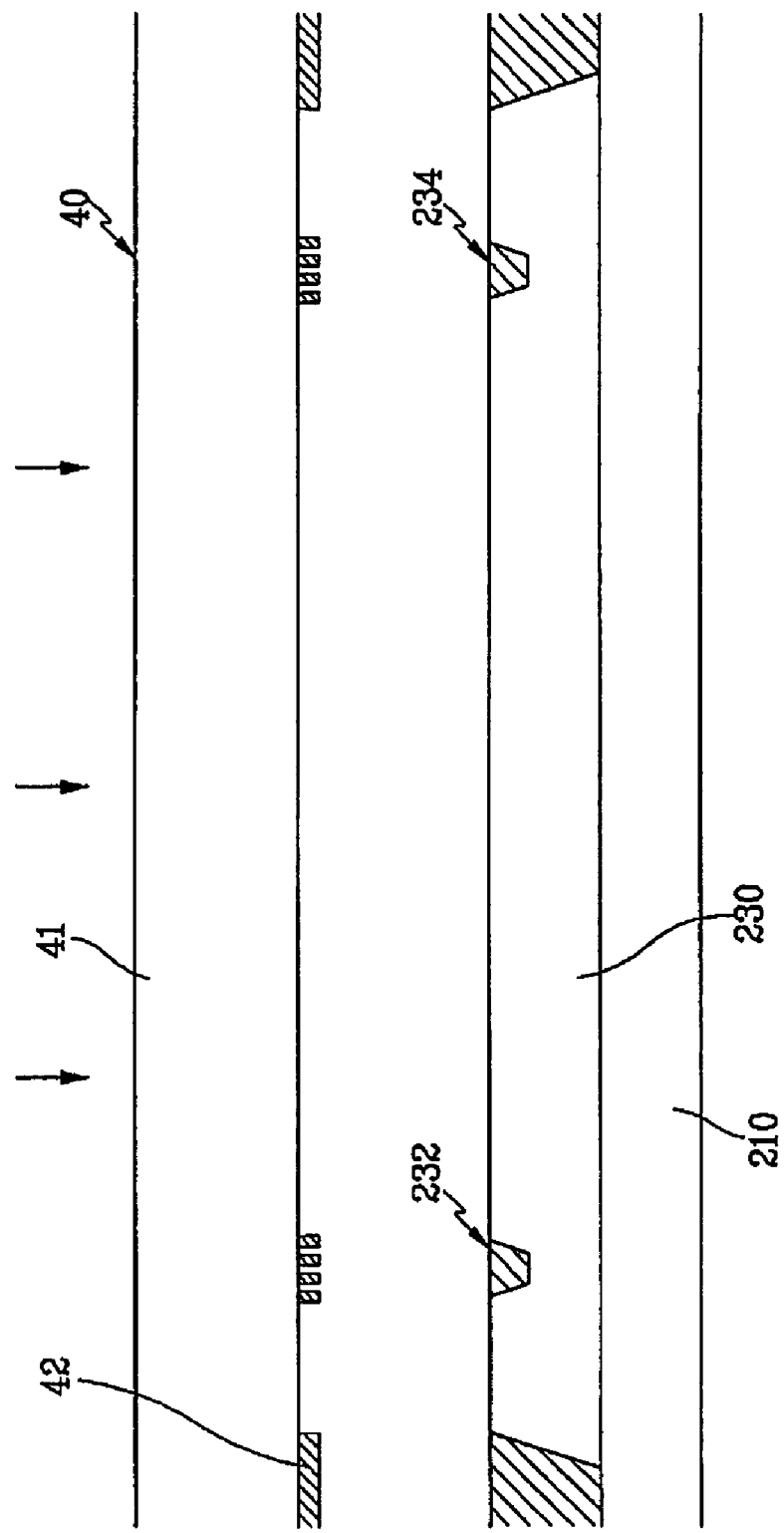

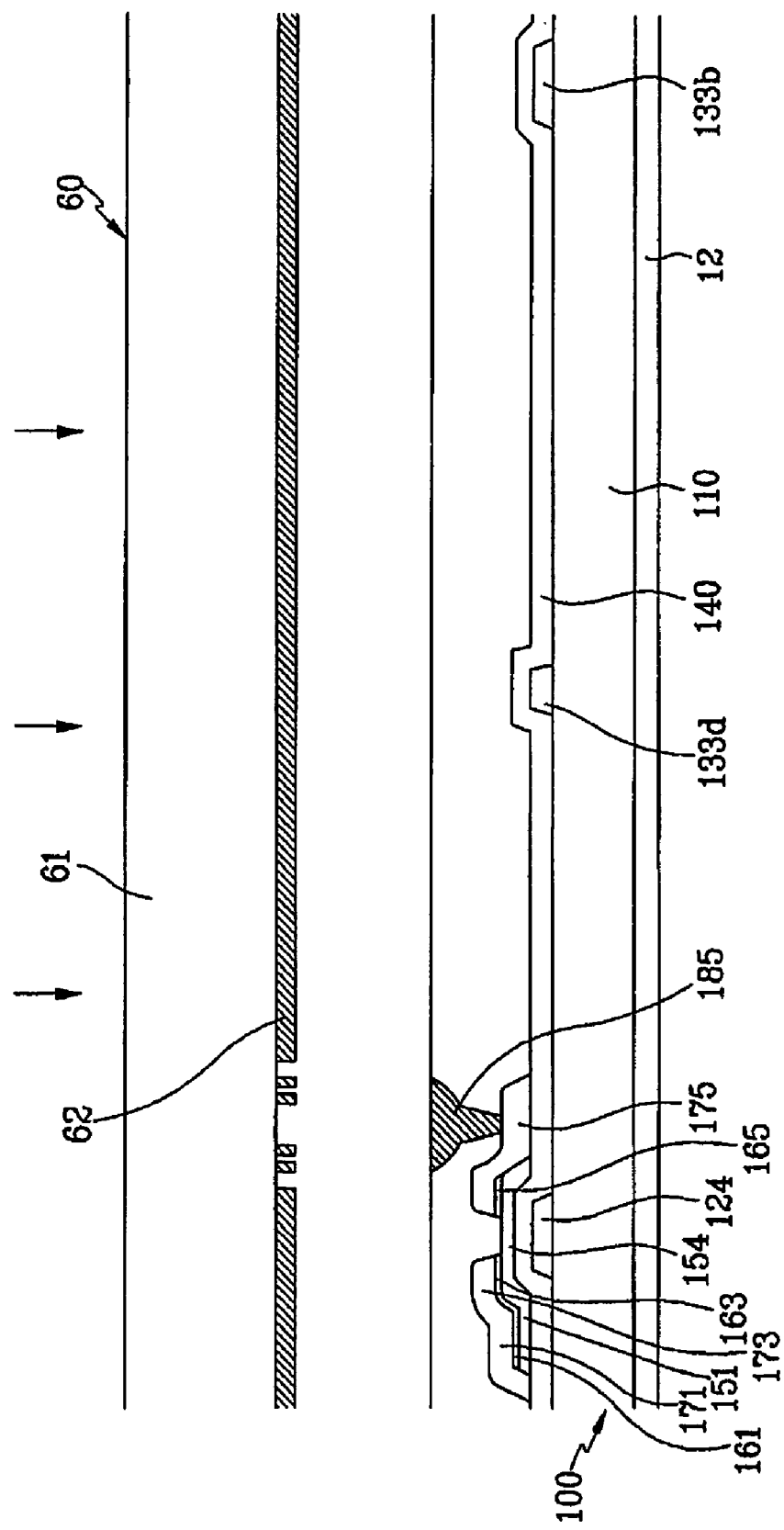

LIQUID CRYSTAL DISPLAY AND MANUFACTURING METHOD THEREOF

BACKGROUND OF THE INVENTION

This application claims the priority of Korean Patent Application No. 10-2004-0036784, filed on May 24, 2004, in the Korean Intellectual Property Office, the disclosure of which is incorporated herein in its entirety by reference.

1. Field of the Invention

The present invention relates to a liquid crystal display and a method for manufacturing the same.

2. Discussion of the Background

A liquid crystal display (LCD) is one of the most widely used flat panel displays. An LCD includes two panels provided with field-generating electrodes, such as pixel electrodes and a common electrode, and a liquid crystal (LC) layer interposed therebetween. The LCD displays images by applying voltages to the field-generating electrodes to generate an electric field in the LC layer, which determines orientations of LC molecules in the LC layer to adjust polarization of incident light.

A vertical alignment (VA) mode LCD, which aligns LC molecules such that the long axes of the LC molecules are perpendicular to the panels in the absence of an electric field, has a high contrast ratio and a wide reference viewing angle, which is defined as a viewing angle.

The wide viewing angle of the VA mode LCD can be realized by cutouts in the field-generating electrodes and protrusions on the field-generating electrodes. Since the cutouts and the protrusions can determine the tilt directions of the LC molecules, the tilt directions may be distributed into several directions by using the cutouts and the protrusions such that the reference viewing angle is widened.

However, because an etchant is used when etching the common electrode to form cutouts in manufacturing method of this LCD, the etchant may penetrate into a color filter in manufacturing process. The penetrated etchant damages and contaminates the color filter. To prevent these problems, a passivation layer may cover the color filter before depositing the common electrode, therefore the manufacturing process becomes complicated. In addition, adding the protrusions on the field-generating electrodes adds operations to the manufacturing process.

SUMMARY OF THE INVENTION

An object of the invention is to simplify manufacturing methods of liquid crystal display including multi domains. Another object of the invention is to improve response time of liquid crystal display including multi domains.

The present invention discloses a crystal display, including a substrate, a color filter having a depression and an opening and formed on the substrate, a common electrode having a depression and formed on the color filter, and a light blocking member formed on the common electrode and located at the depression of the common electrode.

The present invention discloses a liquid crystal display, including a first substrate, a plurality of pixel electrodes, provided on the first substrate, including an opening, a second substrate facing the first substrate, a color filter, provided on the second substrate, having a depression facing the pixel electrodes and an opening facing the region between the pixel electrodes, a common electrode, provided on the color filter, having a depression formed by the depression and the opening of the color filter, and a light blocking member provided on the common electrode and located at the depression of the common electrode.

The present invention discloses method for manufacturing a liquid crystal display panel, including forming a color filter having a depression and an opening, forming a common electrode on the color filter, and forming a light blocking member on the common electrode, wherein, the light blocking member is formed by a photolithography process using a photo-mask having an opaque area facing the depression of the color filter, a translucent area facing the opening of the color filter, and a transmissive area facing a portion of the color filter that does not include the depression or the opening.

The present invention discloses a liquid crystal display, including a substrate, a color filter, provided on the substrate, having a depression and an opening, a common electrode, provided on the color filter, having a depression formed by the depression and the opening of the color filter, and a black matrix formed on the common electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention

FIG. 6A and FIG. 6B are sectional views of the common electrode panel shown in FIG. 2, FIG. 3, and FIG. 4 in intermediate steps of a manufacturing method thereof according to an embodiment of the invention.

FIG. 8A and FIG. 8B are sectional views of the TFT array panel, respectively, showing the TFT array panel after the manufacturing method is performed following the TFT array panel shown in FIG. 7A and FIG. 7B.

DETAILED DESCRIPTION OF THE ILLUSTRATED EMBODIMENTS

Figure 1:
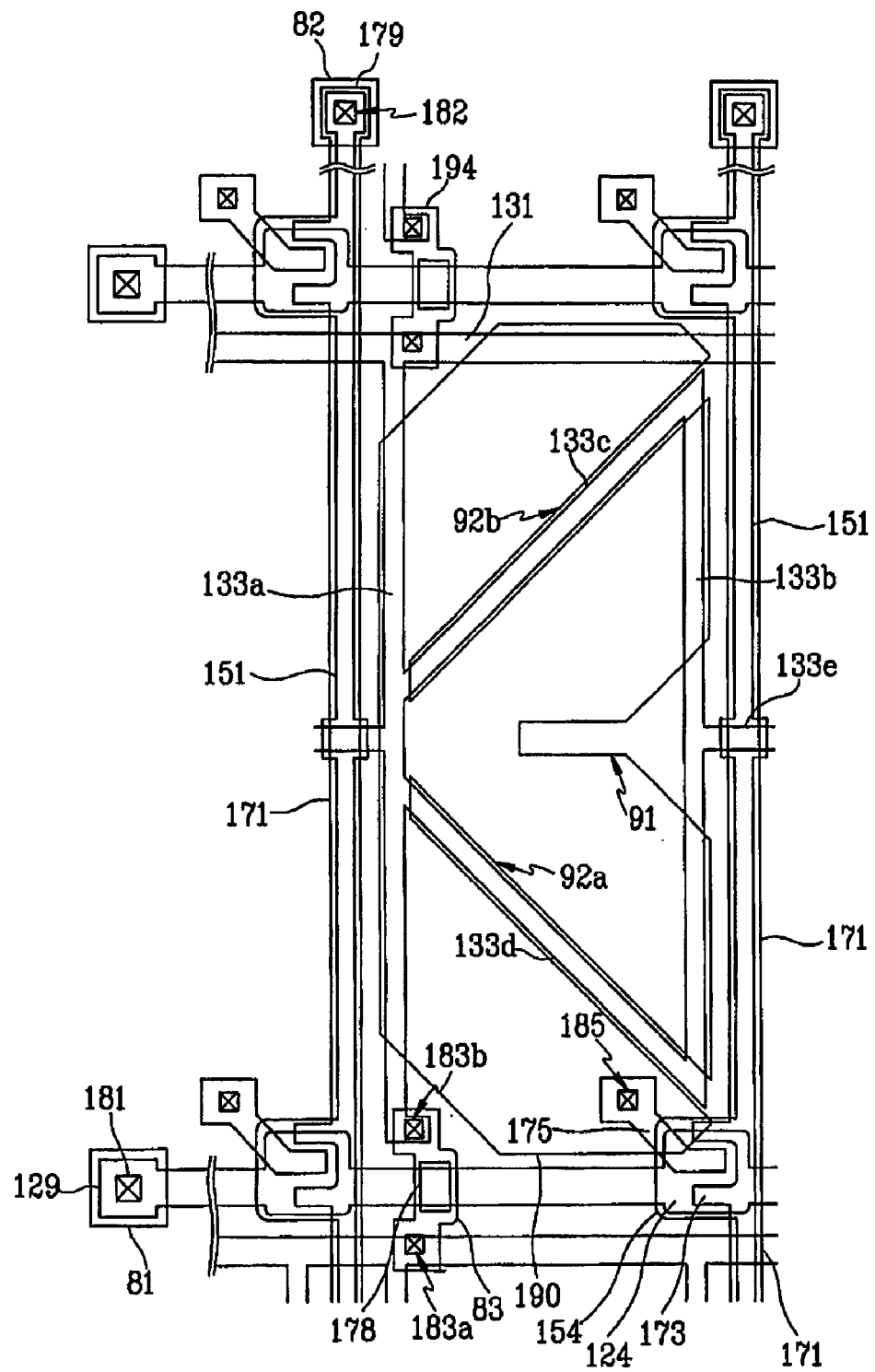
FIG. 1 is a layout view of a TFT array panel of an LCD according to an embodiment of the invention.

The present invention now is described more fully hereinafter with reference to the accompanying drawings, in which preferred embodiments of the invention are shown. The present invention may, however, be embodied in many different forms and should not be construed as limited to the embodiments set forth herein.

In the drawings, the thickness of layers, films and regions are exaggerated for clarity. Like numerals refer to like elements throughout. It will be understood that when an element such as a layer, film, region or substrate is referred to as being "on" another element, it can be directly on the other element or intervening elements may also be present. In contrast, when an element is referred to as being "directly on" another element, there are no intervening elements present.

Liquid crystal displays according to embodiments of the invention are described below with reference to the accompanying drawings. An LCD is described with reference to FIG. 1, FIG. 2, FIG. 3, FIG. 4, and FIG. 5.

Figure 2:
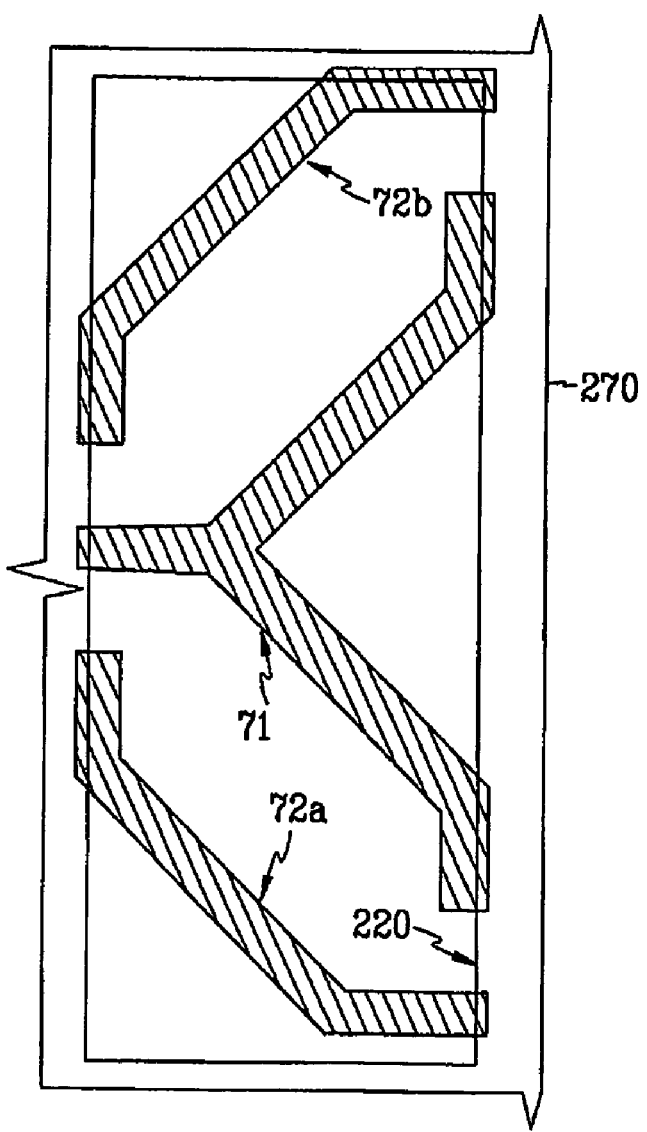
FIG. 2 is a layout view of a common electrode panel of an LCD according to an embodiment of the invention.
Figure 3:
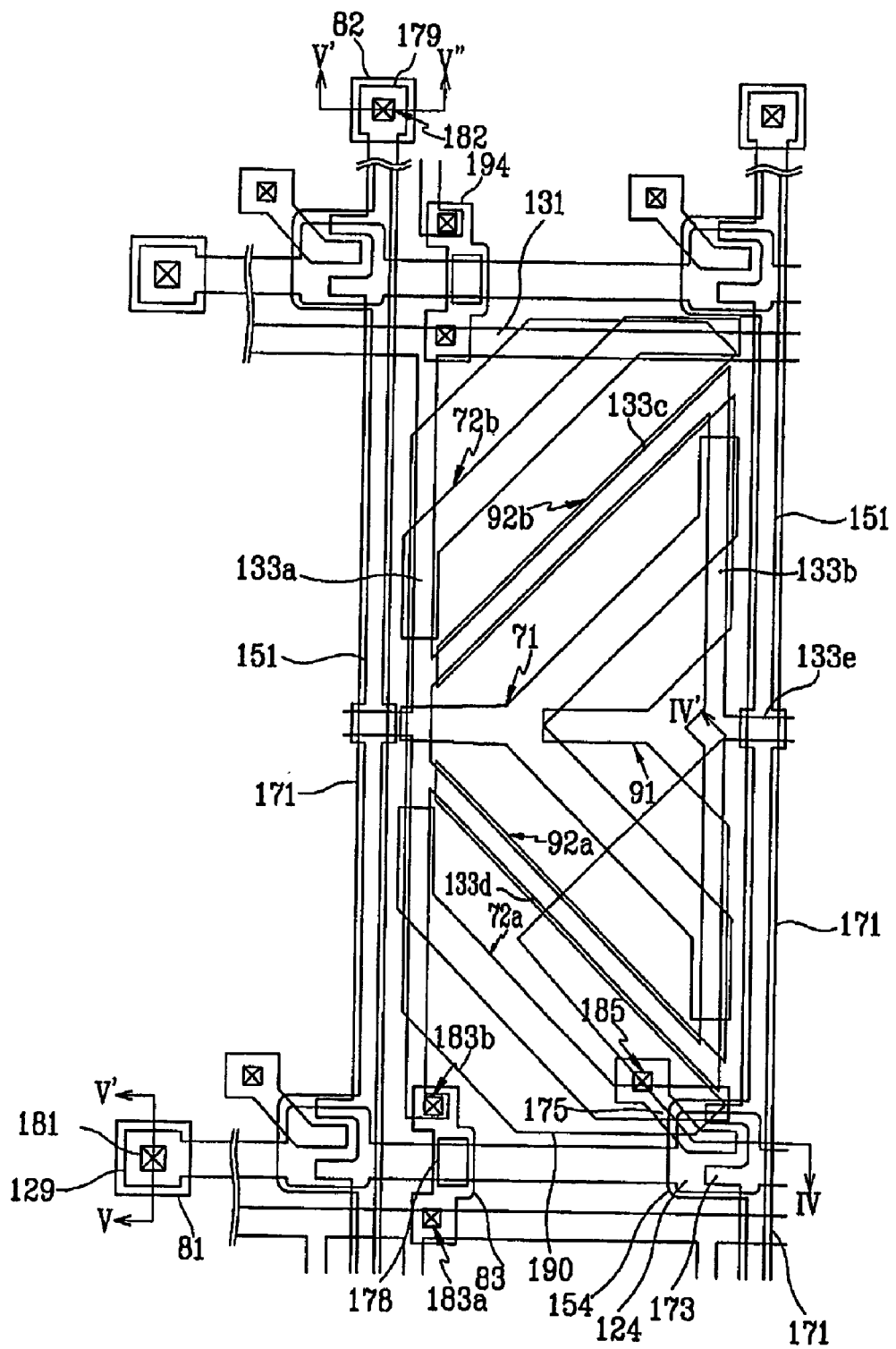
FIG. 3 is a layout view of an LCD including the TFT array panel shown in FIG. 1 and the common electrode panel shown in FIG. 2.
Figure 4:
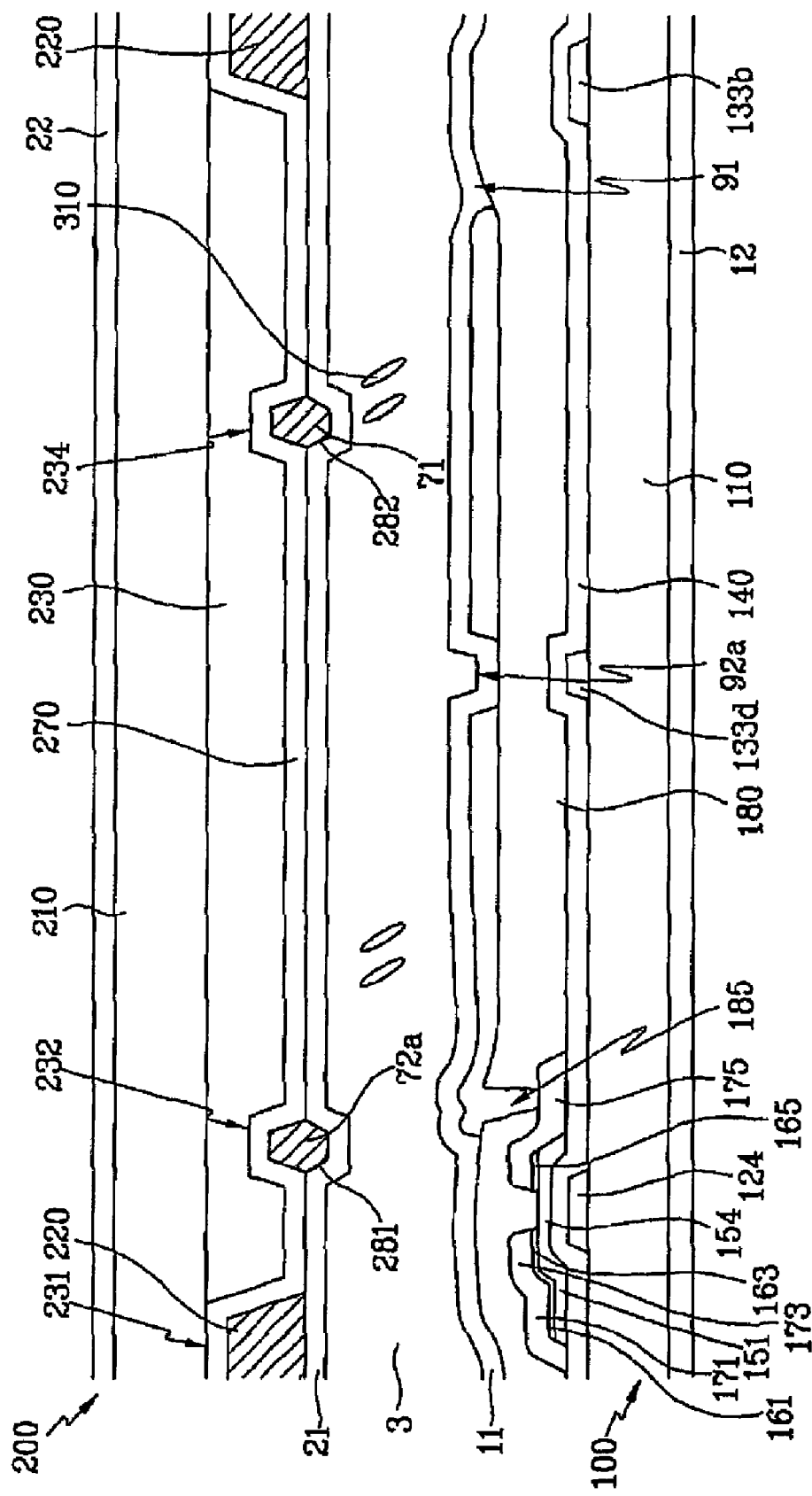
FIG. 4 is a sectional view of the LCD shown in FIG. 3 taken along the line IV-IV'.
Figure 5:
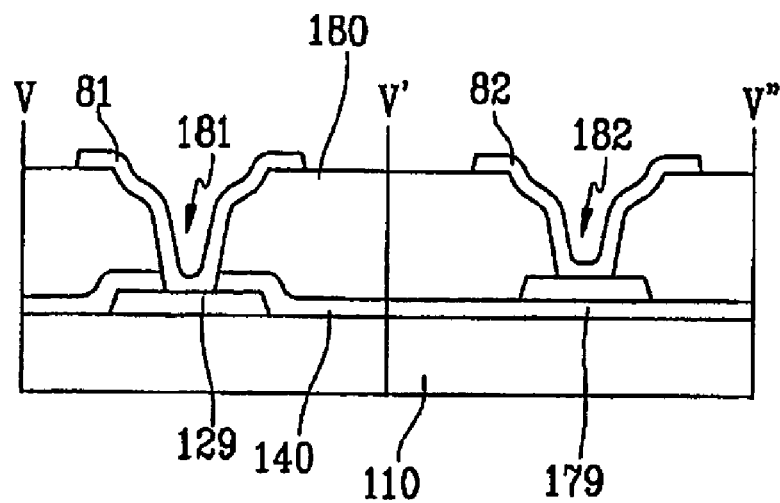
FIG. 5 is a sectional view of the LCD shown in FIG. 3 taken along the lines V-V' and V'-V'''.

FIG. 1 is a layout view of a TFT array panel of an LCD, FIG. 2 is a layout view of a common electrode panel of an LCD, FIG. 3 is a layout view of an LCD including the TFT array panel shown in FIG. 1 and the common electrode panel shown in FIG. 2, and FIG. 4 and FIG. 5 are sectional views of the LCD shown in FIG. 3 taken along the lines IV-IV', V-V'-V'', respectively.

Referring to FIG. 1, FIG. 2, FIG. 3, FIG. 4, and FIG. 5, an LCD includes a TFT array panel 100, a common electrode panel 200, and a LC layer 3 interposed between the TFT array panel 100 and the common electrode panel 200. The TFT array panel 100 is described with reference FIG. 1, FIG. 3, and FIG. 4.

A plurality of gate lines 121 and a plurality of storage electrode lines 131 are formed on an insulating substrate 110, such as transparent glass.

The gate lines 121 extend substantially in a transverse direction and are separated or spaced apart from each other and transmit gate signals. Each gate line 121 includes a plurality of projections forming a plurality of gate electrodes 124 and an end portion 129 having a large area for contact with another layer or an external driving circuit. The gate lines 121 may extend to be connected with a driving circuit that may be integrated or provided on the TFT array panel 100.

Each storage electrode line 131 extends substantially in the transverse direction and is disposed between two of the gate lines 121 such that the storage electrode line 131 is positioned nearer to an upper one of the two gate lines 121, as shown, for example, in FIG. 1 and FIG. 3. Each storage electrode line 131 includes a plurality of sets of branches 133a, 133b, 133c, and 133d and a plurality of connections 133e connecting the branches 133a, 133b, 133c, and 133d.

A set of branches 133a, 133b, 133c, and 133d includes two longitudinal branches forming first and second storage electrodes 133a and 133b and spaced apart from each other and two oblique branches forming third and fourth storage electrodes 133c and 133d and connected between the first and the second storage electrodes 133a and 133b. In detail, the first storage electrode 133a has a free end portion and a fixed end portion that is connected with the storage electrode line 131 and has a projection. The third and the fourth storage electrodes 133c and 133d extend approximately from a center of the first storage electrode 133a and upper and lower ends of the second storage electrode 133b, respectively.

Each of the connections 133e is connected between a first storage electrode 133a of a set of storage electrodes 133a, 133b, 133c, and 133d and a second storage electrode 133b of another set of storage electrodes 133a-133d adjacent thereto. It is understood that the invention is not limited to the above-described layout of the storage electrodes 133a, 133b, 133c, and 133d.

The storage electrode lines 131 are supplied with a predetermined voltage, such as a common voltage, which is applied to a common electrode 270 on the common electrode panel 200 of the LCD. Each storage electrode line 131 may include a pair of stems extending in the transverse direction.

The gate lines 121 and the storage electrode lines 131 are preferably made of Al containing metal such as Al and Al alloy, Ag containing metal such as Ag and Ag alloy, Cu containing metal such as Cu and Cu alloy, Mo containing metal such as Mo and Mo alloy, Cr, Ti or Ta. The gate lines 121 and the storage electrode lines 131 may be formed of a multi-layered structure including two films having different physical characteristics. One of the two films may be made of low resistivity metal including Al containing metal, Ag containing metal, and Cu containing metal for reducing signal delay or voltage drop in the gate lines 121 and the storage electrode lines 131. The other film may be made of material such as Mo containing metal, Cr, Ta or Ti, which has good physical, chemical, and electrical contact characteristics with materials such as indium tin oxide (ITO) or indium zinc oxide (IZO). According to an embodiment of the invention, a lower film contains Cr and an upper film contains Al—Nd alloy.

In addition, the lateral sides of the gate lines 121 and the storage electrode lines 131 are inclined relative to a surface of the substrate, and the inclination angle thereof ranges from approximately 30 to 80 degrees.

A gate insulating layer 140, which may be made of silicon nitride (SiNx), is formed on the gate lines 121 and the storage electrode lines 131.

A plurality of semiconductor stripes 151, which may be made of hydrogenated amorphous silicon (abbreviated to "a-Si") or polysilicon, are formed on the gate insulating layer 140. Each semiconductor stripe 151 extends substantially in the longitudinal direction and has a plurality of projections 154 branched out toward the gate electrodes 124. The semiconductor stripes 151 are sufficiently wide near the gate lines 121 and the storage electrode lines 131 such that the semiconductor stripes 151 cover large areas of the gate lines 121 and the storage electrode lines 131.

A plurality of ohmic contact stripes 161 and ohmic contact islands 165, which may be made of silicide or n+ hydrogenated a-Si heavily doped with n type impurity such as phosphorous, are formed on the semiconductor stripes 151. Each ohmic contact stripe 161 has a plurality of projections 163, and the projections 163 and the ohmic contact islands 165 are located in pairs on the projections 154 of the semiconductor stripes 151.

The lateral sides of the semiconductor stripes 151 and the ohmic contact stripes 161 and ohmic contact islands 165 are inclined relative to a surface of the substrate, and the inclination angles thereof range between approximately 30 to 80 degrees.

A plurality of data lines 171, a plurality of drain electrodes 175 that are separate from the data lines 171, and a plurality of isolated metal pieces 178 are formed on the ohmic contact stripes 161, ohmic contact islands 165, and the gate insulating layer 140.

The data lines 171 for transmitting data voltages extend substantially in the longitudinal direction and cross the gate lines 121 substantially at right angles. The data lines 171 intersect the storage electrode lines 131 and the connections 133e such that each data line 171 is disposed between the first and the second storage electrodes 133a and 133b of adjacent sets of the branches 133a-133d of the storage electrode lines 131. Each data line 171 includes an end portion 179 having a large area for contact with another layer or an external device. Each data line 171 includes a plurality of source electrodes 173 projecting toward the drain electrodes 175.

Each drain electrode 175 includes an end portion having a portion sufficiently large for contact with another layer and another end portion disposed on a gate electrode 124 and partly enclosed by a source electrode 173. The gate electrode 124, source electrode 173, drain electrode 175, and projection 154 of the semiconductor stripe 151, form a TFT having a channel provided at a region where the projection 154 is disposed between the source electrode 173 and the drain electrode 175.

The isolated metal pieces 178 are disposed on the gate lines 121 near the end portions of the storage electrodes 133a.

The data lines 171, the drain electrodes 175, and the metal pieces 178 are may be made of refractory metal such as Cr, Mo, Ti, Ta, or alloys thereof. Further, the data lines 171, the drain electrodes 175, and the metal pieces 178 may have a multilayered structure that includes a low-resistivity film (not shown) and a good-contact film (not shown), or the data lines 171, the drain electrodes 175, and the metal pieces 178 may have a single layered structure.

Similar to the gate lines 121 and the storage electrode lines 131, the data lines 171 and the drain electrodes 175 may have tapered lateral sides, and the inclination angles thereof may range from approximately 30 to 80 degrees.

The ohmic contact stripes 161 and ohmic contact islands 165 may only be interposed between the underlying semiconductor stripes 151 and the overlying data lines 171 and the overlying drain electrodes 175 thereon and reduce the contact resistance therebetween. The semiconductor stripes 151 include a plurality of exposed portions, which are not covered with the data lines 171 and the drain electrodes 175, such as portions located between the source electrodes 173 and the drain electrodes 175. Although the semiconductor stripes 151 are mostly narrower than the data lines 171, the semiconductor stripes 151 widen near the gate lines 121 and the storage electrode lines 131 as described above, to smooth the profile of the surface, thereby preventing the disconnection of the data lines 171.

A passivation layer 180 is formed on the data lines 171, the drain electrodes 175, the metal pieces 178, and the exposed portions of the semiconductor stripes 151. The passivation layer 180 is may be made of an inorganic insulator material, such as silicon nitride or silicon oxide, a photosensitive organic material having a good flatness characteristic, or a low dielectric insulating material having a dielectric constant less than 4.0, such as a-Si:C:O and a-Si:O:F formed by plasma enhanced chemical vapor deposition (PECVD). The passivation layer 180 may have a double-layered structure that includes a lower inorganic film layer and an upper organic film layer.

The passivation layer 180 has a plurality of contact holes 182 and 185 exposing the end portions 179 of the data lines 171 and the end portions of the drain electrodes 175, respectively. The passivation layer 180 and the gate insulating layer 140 have a plurality of contact holes 181 exposing the end portions 129 of the gate lines 121, a plurality of contact holes 183a exposing portions of the storage electrode lines 131 near the fixed end portions of the first storage electrodes 133a and a plurality of contact holes 183b exposing the projections of the free end portions of the first storage electrodes 133a.

A plurality of pixel electrodes 190, a plurality of contact assistants 81 and 82, and a plurality of overpasses 83, which are may be made of a transparent conductor material, such as ITO or IZO, or a reflective conductor material, such as Ag or Al, are formed on the passivation layer 180.

The pixel electrodes 190 are physically connected with and coupled to the drain electrodes 175 through the contact holes 185 such that the pixel electrodes 190 receive data voltage from the drain electrodes 175.

The pixel electrodes 190 supplied with data voltage generates an electric field in cooperation with the common electrode 270, which determines the orientation of liquid crystal molecules 310 in the liquid crystal layer 3.

A pixel electrode 190 and the common electrode 270 form a liquid crystal capacitor, which stores applied voltages after the TFT is turned off. An additional capacitor, referred to as a "storage capacitor," is connected in parallel with the liquid crystal capacitor to increase the voltage storing capacity. The storage capacitors are implemented by overlapping the pixel electrodes 190 with the storage electrode lines 131 including the storage electrodes 133a-133d.

Each pixel electrode 190 is chamfered or beveled at its left corners and the chamfered edges of the pixel electrode 190 form approximately a 45 degree angle with the gate lines 121.

Each pixel electrode 190 has a lower cutout 92a, a center cutout 91, and an upper cutout 92b, which partition the pixel electrode 190 into a plurality of partitions. The cutouts 91, 92a, and 92b have a substantially inverted symmetry with respect to an imaginary transverse line bisecting the pixel electrode 190.

The lower cutouts 92a and the upper cutouts 92b obliquely, or diagonally, extend from a right edge of the pixel electrode 190 near an upper right corner approximately to a center of a left edge of the pixel electrode 190 and overlap the third and the fourth storage electrodes 133c and 133d. The lower cutouts 92a and the upper cutouts 92b are disposed at lower and upper halves of the pixel electrode 190, respectively, with respect to the imaginary transverse line dividing the pixel electrode 190. The lower cutouts 92a and the upper cutouts 92b form approximately a 45 degree angle with the gate lines 121 and extend substantially perpendicular to each other.

The center cutout 91 extends along the imaginary transverse line dividing the pixel electrode 190 and has an inlet from the right edge of the pixel electrode 190, which has a pair of inclined edges substantially parallel to the lower cutout 92a and the upper cutout 92b, respectively.

Accordingly, the lower half of the pixel electrode 190 is partitioned into two lower partitions by the lower cutout 92a and the upper half of the pixel electrode 190 is also partitioned into two upper partitions by the upper cutout 92b. It is understood that the number of partitions or the number of the cutouts varies depending on design factors, such as the size of pixels, the ratio of the transverse edges and the longitudinal edges of the pixel electrodes, the type and characteristics of the liquid crystal layer 3, etc.

The contact assistants 81 and 82 are connected with the end portions 129 of the gate lines 121 and the end portions 179 of the data lines 171 through the contact holes 181 and 182, respectively. The contact assistants 81 and 82 protect the end portions 129 and 179 and complement the adhesion of the end portions 129 and 179 and external devices.

The overpasses 183 cross over the gate lines 121 and they are connected with the exposed projection of the fixed end portions of the first storage electrodes 133a and the exposed portions of the storage electrode lines 131 through the contact holes 183b and 183a, respectively, which are disposed opposite each other with respect to the gate lines 121. The overpasses 183 overlaps the metal pieces 178 and they may be coupled to the metal pieces 178. The storage electrode lines 131 including the storage electrodes 133a, 133b, 133c, and 133d along with the overpasses 183 and the metal pieces 178 are used to repair defects in the gate lines 121, the data lines 171, or the TFTs. The electrical connection between the gate lines 121 and the storage electrode lines 131 for repairing the gate lines 121 is obtained by illuminating the cross points of the gate lines 121 and the overpasses 83 by a laser beam to couple the gate lines 121 with the overpasses 83. The metal pieces 178 enhance the electrical connection between the gate lines 121 and the overpasses 183.

The description of the common electrode panel 200 follows with reference to FIG. 2, FIG. 3, and FIG. 4.

A plurality of color filters 230 are formed on the substrate 210 that substantially face the pixel electrode 190 of the thin film transistor array panel. The color filters 230 may represent one of the primary colors, such as red, green, and blue. Each of the color filters 230 includes a plurality of depressions 232 and 234, and the surface step due to the depressions 232 and 234, and the adjacent color filters 230 are divided at predetermined distances to form a plurality of openings 231. A portion of the surface of the substrate 210 is exposed through the openings 231, and the exposed portion of the surface of the substrate 210 has a step for the surface of the color filters 230.

A common electrode 270 may be made of a transparent conductive material, such as ITO and IZO, and is formed on the color filters 230. The surface step formed on the common electrode 270 depends on the surface step of the color filters 230 and the step between the openings 231 and the surface of the color filters 230.

A light blocking member 220, referred to as a black matrix, prevents light leakage and a plurality of sets of protrusions 71, 72a, and 72b are formed or provided on the common electrode 270. The light blocking member 220 is located at or near the openings 231. According to an embodiment of the invention, the light blocking member 220 is thicker than the color filters 230 in order to reduce optical density. When the light blocking member 220 is thin, such as, for example, thinner than the color filters 230, the leakage light is generated through the light blocking member 220.

The sets of protrusions 71, 72a, and 72b are located at the depressions 232 and 234, and have slope surfaces 281 and 282.

A set of protrusions 71, 72a, and 72b face a pixel electrode 190 and include a lower protrusion 72a, a center protrusion 71, and an upper protrusion 72b. Each of the protrusion 71, 72a, and 72b is disposed between adjacent cutouts 91, 92a, and 92b of the pixel electrode 190 or between a cutout 92a or 92b and a chamfered edge of the pixel electrode 190.

Further, each of the protrusions 71, 72a, and 72b includes at least an oblique portion extending parallel to the lower cutout 92a or the upper cutout 92b of the pixel electrode 190, and the distances between adjacent two of the protrusions 71, 72a, and 72b, and 91, 92a, and 92b, the oblique portions thereof, the oblique edges thereof, and the chamfered edges of the pixel electrode 190, which are parallel to each other, are substantially the same. The protrusions 71, 72a, and 72b have substantially an inversion symmetry with respect to the above-described transverse line bisecting the pixel electrode 190.

Each of the lower and upper protrusions 72a and 72b includes an oblique portion extending approximately from a left edge of the pixel electrode 190 to approximately lower or upper edge of the pixel electrode 190, and transverse and longitudinal portions extending from respective ends of the oblique portion along edges of the pixel electrode 190, overlapping the edges of the pixel electrode 190, and making obtuse angles with the oblique portion.

The center protrusion 71 includes a central transverse portion extending approximately from the left edge of the pixel electrode 190 along the third storage electrode 133c, a pair of oblique portions extending from an end of the central transverse portion approximately to a right edge of the pixel electrode and forms obtuse angles with the central transverse portion, and a pair of terminal longitudinal portions extending from the ends of the respective oblique portions along the right edge of the pixel electrode 190, overlapping the right edge of the pixel electrode 190, and forming obtuse angles with the respective oblique portions.

The number of the protrusions 71, 72a, and 72b varies depending on design factors.

Alignment layers 11 and 21 that may be homotropic are coated on inner surfaces of the panels 100 and 200, and polarizers 12 and 22 are provided on outer surfaces of the panels 100 and 200 such that their polarization axes may be crossed and one of the transmissive axes may be parallel to the gate lines 121. One of the polarizers may be omitted when the LCD is a reflective LCD.

The LCD may further include at least one retardation film (not shown), e.g., phase compensating sheet or compensator, for compensating the retardation of the LC layer 3. The retardation film has birefringence and gives a retardation opposite to that given by the LC layer 3. The retardation film may include uniaxial or biaxial optical compensation film and may include a negative uniaxial compensation film.

The LCD may further include a backlight unit (not shown) supplying light to the LC layer 3 through the polarizers 12 and 22, the retardation film, and the panels 100 and 200.

The LC layer 3 may have negative dielectric anisotropy in a range of approximately 3 to 8 and the LC molecules 310 in the LC layer 3 may be vertically aligned such that their long axes are substantially vertical to the surfaces of the alignment layers 11 and 21 in the absence of an electric field. At this time, because the surfaces of the alignments 11 and 21 are parallel with the surfaces of the thin film transistor array panel 100 and the common electrode panel 200 in the greater part, the long axes of the LC molecules 310 in the LC layer 3 are vertically aligned to the surfaces of the thin film transistor array panel 100 and the common electrode panel 200. However, the LC molecules 310 near the alignment layer 21 that are arranged on the slope surfaces 281 and 282 of the protrusions 71 and 72a are pre-tilted near the slope surface of the alignment layer 21 depending on the slope angle of the slope surfaces 281 and 282 of the protrusions 71 and 72a.

An electric field substantially perpendicular to the surfaces of the panels 100 and 200 is generated when applying the common voltage to the common electrode 270 and a data voltage to the pixel electrodes 190. The LC molecules 310 may change orientation in response to the electric field such that the long axes of the LC molecules 310 are perpendicular to the field direction.

In the absence of the electric field, the LC molecules 310 are pre-tilted and the pre-tilt directions of the LC molecules 310 determine the tilt directions of the LC molecules 310 when the electric field is applied. Thus, for example, the tilt motion of the LC molecules 310 is rapidly tilted.

The depression of the common electrode 270 near the protrusions 71, 72a, and 72b caused by the depressions 232 and 234 distorts the electric field to have a horizontal component, and the horizontal component of the electric field is enforced when the dielectric constant of the depressions 71, 72a, and 72b is lower than the LC layer 3. Accordingly, the LC molecules 310 located near the protrusions 71 and 72a are first tilted by the horizontal component, and such tilt determines the tilt directions of the LC molecules 310 located far from the protrusions 71, 72a, and 72b and reduces the response time of the LC molecules 310.

The cutouts 91, 92a, and 92b of the pixel electrodes 190 and the oblique edges of the pixel electrodes 190 distort the electric field so that the electric fields have a horizontal component.

The pre-tilted direction caused by the protrusions 71, 72a, and 72b, the horizontal component of the electric field caused by the depressions 232 and 234, the cutouts 91, 92a, and 92b of the electrodes 190, and the edges of the pixel electrodes 190, distort the electric field to have a charge that is substantially perpendicular to the edges of the cutouts 91, 92a, and 92b and the protrusions 71, 72a, and 72b and the edges of the pixel electrodes 190. Accordingly, the LC molecules on each sub-area tilt in a direction by the horizontal component and the azimuthal distribution of the tilt directions are localized to four directions, thereby increasing the viewing angle of the LCD. The regions of the LC layer 3 having the same tilt direction is referred to as domain, and the cutouts 91, 92a, and 92b and the protrusions 71, 72a, and 72b are referred to as the boundary of the domain.

The side of the storage electrodes 133c and 133d near the cutouts 91, 92a, and 92b of the pixel electrode 190 extend along with the cutouts 91, 92a, and 92b of the pixel electrode 190, and the fringe field caused by the cutouts 91, 92a, and 92b is enforced. Accordingly, the response time for tilting the LC molecules and the texture is improved.

Figure 6B:
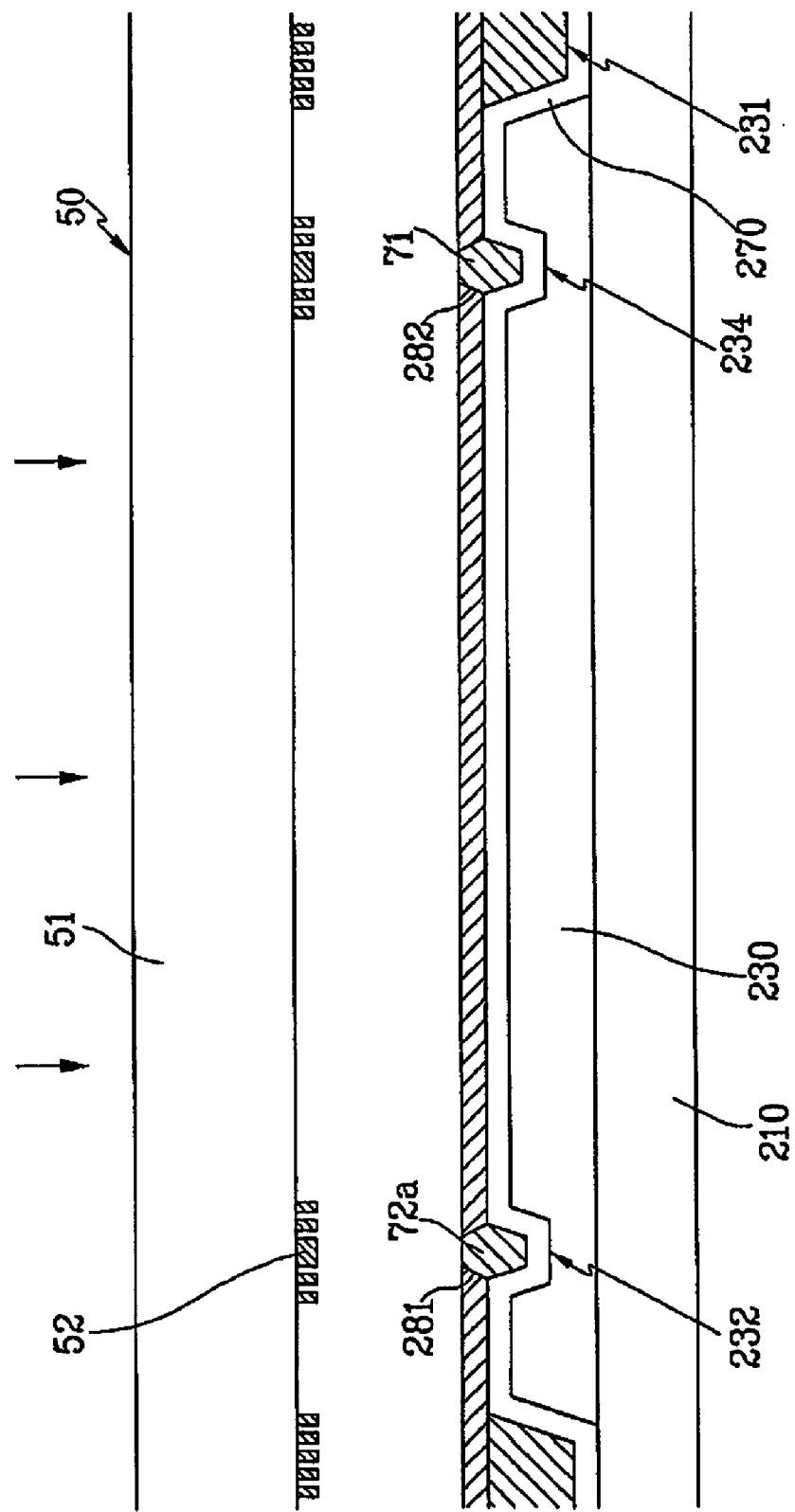

A method of manufacturing a common electrode panel of the LCD shown in FIG. 1, FIG. 2, FIG. 3, FIG. 4, and FIG. 5 according to an embodiment of the invention is described in detail with reference to FIG. 6A and FIG. 6B. FIG. 6A and FIG. 6B are sectional views of a common electrode panel shown in FIG. 2, FIG. 3, and FIG. 4 taken along the line IV-IV'.

Referring to FIG. 6A, a negative photosensitive organic material having red pigments is coated on an insulating substrate 210 to a color filter 230 and a photo-mask 40 is aligned on the substrate 210. The photo-mask 40 has a transparent film 41 and an opaque film 42 formed on the transparent film 41, and includes an opaque area where the opaque film 42 is wider than a predetermined or fixed value, a transmissive area where the opaque film 42 is not formed, and a translucent area of a slit type where the width and the interval of the opaque film 42 is less than a predetermined or fixed value. Portions of the color filter 230 facing the transmissive areas absorb the full energy of the light, while portions of the color filter 230 facing the translucent area partially absorb the light energy. Accordingly, the color filter 230 is developed, and the thickness of the portions of the color filter 230 facing the transmissive area is unchanged, e.g., full thickness, the portions facing the translucent areas have a reduced thickness to form a plurality of depressions 232 and 234, and the portion of the color filter 230 facing the opaque area is removed. The hatched portions of the color filter 230 in FIG. 6A are portions of the color filter to be removed after developing.

After forming a red color filter 230 with the above-described method, negative photosensitive organic materials respectively including green and blue pigments are sequentially coated and developed on the insulating substrate 210 to form green and blue color filters 230, respectively. At this time, the color filters 230 for red, blue and green colors are formed at regular intervals to form a plurality of openings 231

Referring to FIG. 6b, an ITO or IZO layer is subsequently deposited on the color filter 230 to form a common electrode 270. Portions of the common electrode 270 may be depressed due to the depressions 232 and 234 of the color filters 230. The depressed portion of the common electrode 270 generate fringe fields. In this manufacturing method, patterning the common electrode 270 is omitted through the photolithography process, and the fringe field to form a plurality of domains may effectively be generated. Accordingly, the manufacturing methods may be simplified, and ITO etchant may prevent the color filters from damaging.

A positive photosensitive organic material containing black pigments is subsequently coated, and an exposure-mask 50 is aligned on the insulating substrate 210. The photo-mask 50 has a transparent film 51 and an opaque film 52 formed on the transparent film 51, and includes an opaque area where the opaque film 52 is wider than a predetermined or fixed value, a transmissive area where the opaque film 42 is not formed, and a translucent area of a slit type where the width and the interval of the opaque film 42 is less than a predetermined or fixed value.

At this time, the opaque area and the translucent area are respectively aligned at the depressions 232 and 234 of the color filters 230. Accordingly, the organic layer is exposed through the photo-mask 50 and forms a blocking light member 220 and a plurality of protrusions 71 and 72a. The thickness of the organic layer and the intervals of slits are determined according to the height of center portions of the protrusions 71 and 72a, the slope angle of the surface of the protrusions 71 and 72a, and the blocking light member 220. According to an embodiment of the invention, the intervals and the widths of slits are determined such that the thicknesses of the blocking light member 220 is the same as the thickness of the color filters 230.

Figure 7A:
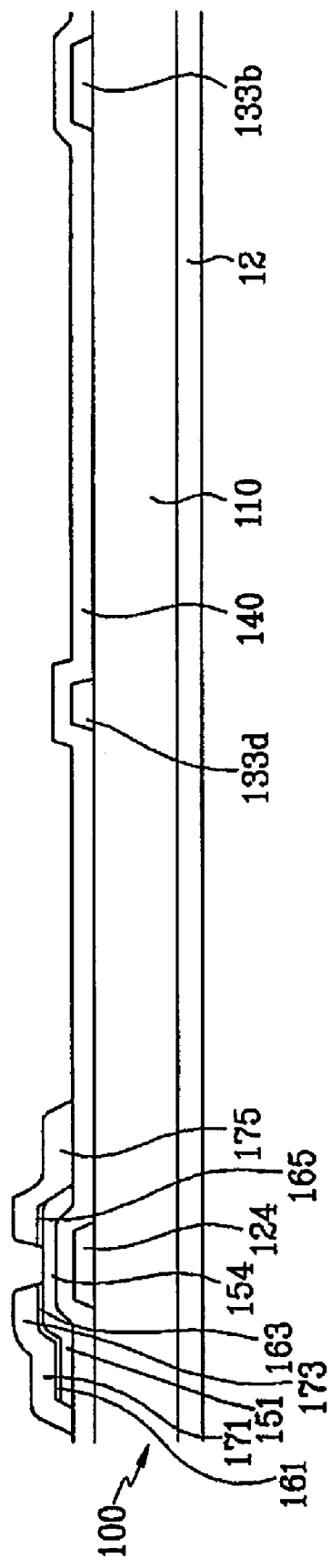
FIG. 7A and FIG. 7B are sectional views of the TFT array panel shown in FIG. 1, FIG. 3, FIG. 4, and FIG. 5 in an intermediate step of a manufacturing method thereof according to an embodiment of the invention.
Figure 7B:
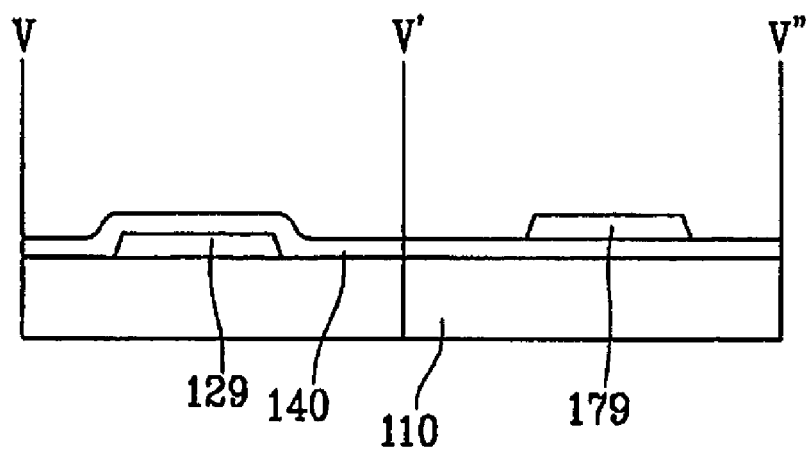
Figure 8B:
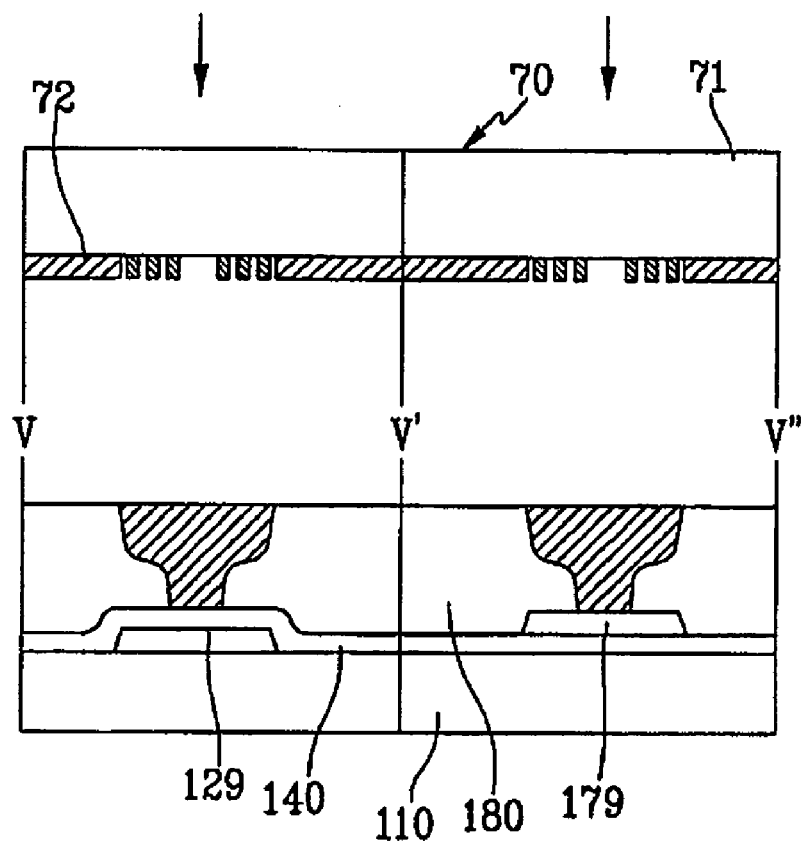

A method of manufacturing the TFT array panel shown in FIG. 1, FIG. 2, FIG. 3, FIG. 4, and FIG. 5 according to an embodiment of the invention is described below in detail with reference to FIG. 7A, FIG. 7B, FIG. 8A, and FIG. 8B. FIG. 7A and FIG. 7B are sectional views of the TFT array panel shown in FIG. 1 and FIG. 3, FIG. 4, and FIG. 5. FIG. 8A and FIG. 8B are sectional views of the TFT array panel, respectively, showing the TFT array panel after the TFT array panel shown in FIG. 7A and FIG. 7B has subsequently undergone another manufacturing method.

Referring to FIG. 1, FIG. 7A and FIG. 7B, a conductive layer of metal such as Al, Al alloy, Ag, Ag alloy, Cr, Mo, Mo alloy, Ti or Ta is sputtered on an insulating substrate 110 and the substrate is wet or dry etched in sequence to form a plurality of gate lines 121 including gate electrodes 124 and end portions 129, a plurality of storage electrode lines 131 including storage electrodes 133a-133d, and a connection 133e (the first mask). The gate lines 121 and the storage electrode lines 131 may have a double layered structure that includes two films having different physical characteristics. One of the two films may be made of a low resistivity metal material including Al containing metal, Ag containing metal, and Cu containing metal to reduce signal delay or voltage drop in the gate lines 121 and the storage electrode lines 131. The other film is may be made of a material such as Mo containing metal, Cr, Ta or Ti, which has good physical, chemical, and electrical contact characteristics with other materials.

After the gate insulating layer 140 is formed by a sequential deposition process such that the thickness of the gate insulating layer varies between approximately 1,500 to 5,000 Å, an intrinsic a-Si layer with thickness of between approximately 500 to 2,000 Å, and an extrinsic a-Si layer with thickness of between approximately 300 to 600 Å, wherein the extrinsic a-Si layer and the intrinsic a-Si layer are photo-etched to form a plurality of extrinsic semiconductor stripes and a plurality of intrinsic semiconductor stripes 151 including projections 154 on the gate insulating layer 140 (the second mask).

A conductive film having a thickness of between approximately 1,500 to 3,000 Å is subsequently sequentially sputtered and patterned to form a plurality of date lines 171 including source electrodes 173 and end portions 179, and a plurality of drain electrodes 175. The conductive film may be made of Cr, Mo, Mo alloy, Al, Al alloy, Ag, Ag alloy (the third mask). The conductive film may also be formed to have a double layered structure that includes two films having different physical characteristics. One of the two films may be made of a low resistivity metal material including Al containing metal, Ag containing metal, and Cu containing metal for reducing signal delay or voltage drop in the gate lines 121 and the storage electrode lines 131. The other film may be made of a material such as Mo containing metal, Cr, Ta or Ti, which has good physical, chemical, and electrical contact characteristics with other materials.

Portions of the extrinsic semiconductor stripes, which are not covered with the data lines 171 and the drain electrodes 175, are subsequently removed to complete a plurality of ohmic contact stripes 161 including projections 163 and a plurality of ohmic contact islands 165 and to expose portions of the intrinsic semiconductor stripes 151. Oxygen plasma treatment may be subsequently performed to stabilize the exposed surfaces of the semiconductor stripes 151.

Referring to FIG. 8A and FIG. 8B, a passivation layer 180 made of a photosensitive organic insulator is coated and exposed through a photo-mask 60 having a plurality of opaque film 62, a transparent film 61, and slit parts (the fourth mask). The passivation layer 180 is subsequently developed to form a plurality of contact holes 182 and 185 exposing portions of the end portions 179 of the data lines 171 and portions of the drain electrodes 175, respectively, and to form a plurality of contact holes 181 exposing the end portions 129 of the gate lines 121. At this time, the slit parts are aligned to the sidewalls of the contact holes 181, 182 and 185 to form the sidewalls of the contact holes 181, 182 and 185 having stepped or slope profiles.

Next, a plurality of pixel electrodes 190 and a plurality of contact assistants 81 and 82 are formed on the passivation layer 180 by sputtering and photo-etching an IZO or ITO layer with thickness of between approximately 400 to 500 Å, as shown in FIG. 4 and FIG. 5 (the fifth mask).

Five photo-masks are used in the above-described manufacturing method, however the invention is not limited to the above described five photo-masks. For example, according to another embodiment on the invention, only four photo-masks may be used to complete a thin film transistor array panel.

In above-described embodiments of the LCD, although the photolithography of the common electrode 270 of the common electrode panel 200 is omitted, the fringe field effect may be provided by making the depressions of the common electrode 270 corresponding to the depressions 232 and 234 of the color filters 230. Therefore, the problems generated by patterning the common electrode 270, such as damage of color filters and formation of an overcoat covering the common electrode, may be removed.

Additionally, the protrusions formed in the photolithography process forming the blocking light member are used to divide the color filter into multi-domains and to control the domains, and the process of forming a protrusion may be omitted, which simplifies the manufacturing method of the LCD.

Further, the LCD of vertical aligned (VA) type including the protrusions may reduce the response time of LC molecules. The response characteristics of the LCD may be improved by rapidly and partially controlling response time of VA type LCD. Also, the simplified manufacturing process of the LCD reduces manufacturing costs.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display, comprising:
   a first substrate;
   a plurality of gate lines on the first substrate;
   a plurality of data lines extending across the gate lines;
   a plurality of pixels defined by the gate lines and the data lines;
   a second substrate;
   a color filter including a depression, formed on the second substrate, corresponding to each pixel;
   a common electrode formed on the color filter;
   a light blocking member, disposed between the pixels, formed on the common electrode; and
   a protrusion formed on the common electrode located at the depression of the color filter;
   wherein the protrusion is made of the same material as the light blocking member.

2. The liquid crystal display of claim 1, further comprising a depression of the common electrode formed by the depression and the opening of the color filter.

3. The liquid crystal display panel of claim 1, wherein the protrusion has a sloped surface.

4. The liquid crystal display of claim 1, wherein the color filter includes a opening and the light blocking member includes a portion that overlaps the opening of the color filter and has substantially a same height as a height of the color filter.

5. The liquid crystal display of claim 1, wherein the light blocking member comprises an organic material.

6. A liquid crystal display, comprising:
   a first substrate;
   a plurality of pixel electrodes, provided on the first substrate, including an opening;
   a second substrate facing the first substrate;
   a color filter, provided on the second substrate, having a depression facing the pixel electrodes and an opening facing the region between the pixel electrodes;
   a common electrode, provided on the color filter, having a depression formed by the depression of the color filter;
   a light blocking member provided on the common electrode; and
   a protrusion formed on the common electrode located at the depression of the color filter,
   wherein the protrusion is made of the same material as the blocking member.

7. The liquid crystal display panel of claim 6, wherein the protrusion has a sloped surface.

8. The liquid crystal display of claim 6, wherein the light blocking member includes a portion overlapping the opening of the color filter and has substantially a same height as a height of the color filter.

9. The liquid crystal display of claim 6, further comprising: a liquid crystal layer formed between the first and the second substrates, and having negative dielectric anisotropy.

10. The liquid crystal display of claim 9, wherein negative dielectric anisotropy of the liquid crystal layer is in a range of approximately 3 to 8.

11. The liquid crystal display of claim 10, wherein the light blocking member comprises an organic insulator having a dielectric constant that is less than or equal to a dielectric constant of the liquid crystal layer.

12. A method for manufacturing a liquid crystal display panel, comprising:

forming a color filter having a depression and an opening;

forming a common electrode on the color filter; and forming a light blocking member on the common electrode, wherein the light blocking member is formed by a photolithography process using a photo-mask having an opaque area facing the depression of the color filter, a translucent area facing the opening of the color filter, and a transmissive area facing a portion of the color filter that does not include the depression or the opening.

13. The method of claim 12, further comprising:

forming the color filter by a photolithography process using a photo-mask having an opaque portion facing the opening of the color filter, a translucent portion facing the depression of the color filter, and a transmissive area facing a portion of the color filter that does not include the depression or the opening.

14. The method of claim 12, wherein the light blocking member has a protrusion overlapping the depression of the color filter and protruded to the upside of the color filter.

15. The liquid crystal display panel of claim 14, wherein the protrusion has a sloped surface.

16. A liquid crystal display, comprising:

a substrate;

a color filter, provided on the substrate, having a depression and an opening;

a common electrode, provided on the color filter, having a depression formed by the depression of the color filter, and having a first surface and a second surface located father from the substrate than the first surface;

a black matrix formed on the common electrode and contacting the second surface of the common electrode; and a protrusion formed on the common electrode located at the depression of the color filter, wherein the protrusion is made of the same material as the black matrix.

17. The liquid crystal display of claim 16, wherein the black matrix is located at the opening of the color filter.

* * * * *